US010440772B2

(12) United States Patent
Shi et al.

(10) Patent No.: US 10,440,772 B2
(45) Date of Patent: Oct. 8, 2019

(54) FAST USER EQUIPMENT RECONFIGURATION SIGNALING IN WIRELESS COMMUNICATION

(71) Applicant: QUALCOMM Incorporated, San Diego, CA (US)

(72) Inventors: Yongsheng Shi, San Diego, CA (US); Aziz Gholmieh, Del Mar, CA (US); Daniel Amerga, San Diego, CA (US); Shailesh Maheshwari, San Diego, CA (US); Srinivasan Balasubramanian, San Diego, CA (US)

(73) Assignee: QUALCOM Incorporated, San Diego, CA (US)

( * ) Notice: Subject to any disclaimer, the term of this patent is extended or adjusted under 35 U.S.C. 154(b) by 0 days.

(21) Appl. No.: 15/905,529

(22) Filed: Feb. 26, 2018

(65) Prior Publication Data

US 2018/0324888 A1 Nov. 8, 2018

Related U.S. Application Data

(60) Provisional application No. 62/500,429, filed on May 2, 2017.

(51) Int. Cl.
*H04W 76/27* (2018.01)
*H04W 76/30* (2018.01)
(Continued)

(52) U.S. Cl.
CPC .......... *H04W 76/27* (2018.02); *H04W 8/245* (2013.01); *H04W 76/10* (2018.02); *H04W 76/20* (2018.02);
(Continued)

(58) Field of Classification Search
CPC .. H04W 28/18; H04W 8/245; H04W 52/0274
See application file for complete search history.

(56) References Cited

U.S. PATENT DOCUMENTS 8,254,921 B2 8/2012 Grilli et al.
9,480,098 B2 * 10/2016 Chen .................... H04W 76/20
(Continued)

FOREIGN PATENT DOCUMENTS

WO 06020983 2/2006

OTHER PUBLICATIONS

"3rd Generation Partnership Project; Technical Specification Group Radio Access Network; Radio Resource Management Strategies (Release 7)", 3GPP Standard; 25922-710, 3rd Generation Partnership Project (3GPP), Mobile Competence Centre; 650, Route Des Lucioles; F-06921 Sophia-Antipolis Cedex; France, Apr. 6, 2007 (Apr. 6, 2007), XP050909988, pp. 1-95, Retrieved from the Internet: URL: http://www.3gpp.org/ftp/Specs/2014-12/Rel-7/25_series/ [retrieved on Apr. 6, 2007].

(Continued)

*Primary Examiner* — Melanie Jagannathan
(74) *Attorney, Agent, or Firm* — Loza & Loza, LLP

(57) ABSTRACT

Aspects of the present disclosure provide methods and apparatuses that use various connection reconfiguration signaling schemes to enable fast user equipment reconfiguration in wireless networks. A network can reduce reconfiguration signaling traffic or overhead by reducing the amount of configuration data sent to each user equipment (UE) in a reconfiguration message. In some examples, when a UE first enters a network area, the network may provide the UE with a list of commonly used baseline configurations. Each baseline configuration may be identified by an index and a value tag. Subsequently, the network may transmit a reconfiguration message including, for example, only the index and value tag to indicate the desired configuration.

32 Claims, 12 Drawing Sheets

(51) Int. Cl.
    *H04W 76/10*     (2018.01)
    *H04W 8/24*     (2009.01)
    *H04W 76/20*     (2018.01)
    *H04W 76/16*     (2018.01)
    *H04W 76/15*     (2018.01)

(52) U.S. Cl.
    CPC ............ H04W 76/30 (2018.02); *H04W 76/15* (2018.02); *H04W 76/16* (2018.02)

(56) References Cited

U.S. PATENT DOCUMENTS

| | | | |
|---|---|---|---|
| 2006/0040645 A1* | 2/2006 | Grilli | H04W 28/18 455/412.1 |
| 2008/0125043 A1 | 5/2008 | Karmanenko et al. | |
| 2013/0343297 A1* | 12/2013 | Dinan | H04W 72/042 370/329 |
| 2014/0056243 A1 | 2/2014 | Pelletier et al. | |
| 2014/0185530 A1* | 7/2014 | Kuchibhotla | H04W 4/90 370/329 |
| 2015/0282246 A1* | 10/2015 | Teyeb | H04W 36/0072 370/312 |
| 2015/0304955 A1* | 10/2015 | Manepalli | H04W 52/0274 370/311 |
| 2016/0050050 A1* | 2/2016 | Kang | H04B 7/0617 370/329 |

OTHER PUBLICATIONS

International Search Report and Written Opinion—PCT/US2018/019955—ISA/EPO—dated May 9, 2018.

* cited by examiner

| Index | Baseline Configuration | Value Tag |
|---|---|---|
| 1 | Configuration 1 | 1 |
| 2 | Configuration 2 | 2 |
| 3 | Configuration 3 | 2 |
| 4 | Configuration 4 | n |

FIG. 8

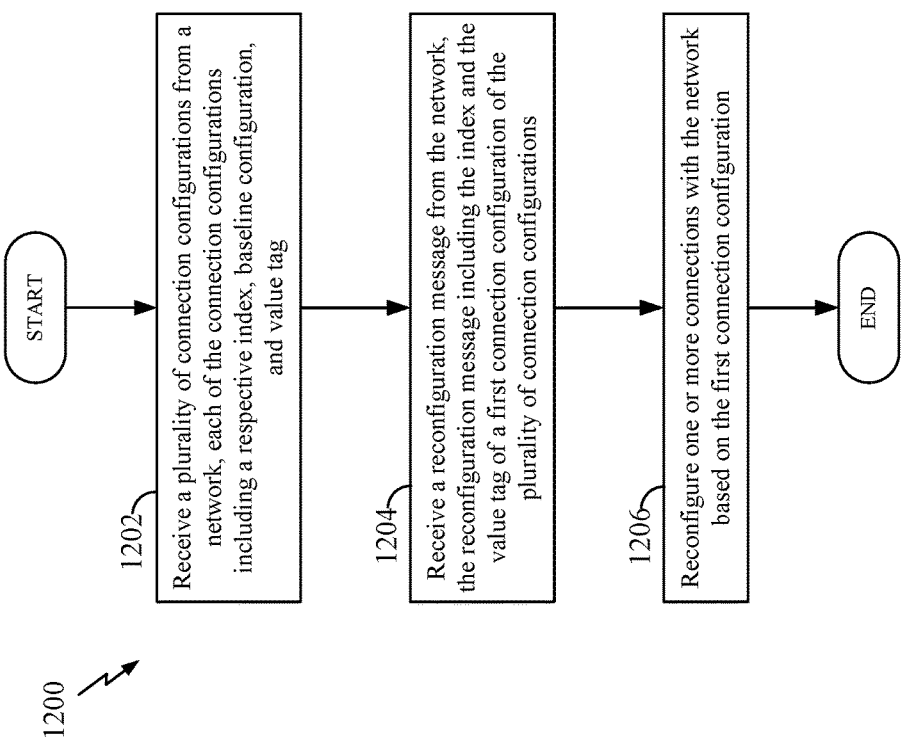

FAST USER EQUIPMENT RECONFIGURATION SIGNALING IN WIRELESS COMMUNICATION

PRIORITY CLAIM

This application claims priority to and the benefit of U.S. provisional patent application No. 62/500,429 filed in the United States Patent and Trademark Office on 2 May 2017, the entire content of which is incorporated herein by reference as if fully set forth below in its entirety and for all applicable purposes.

TECHNICAL FIELD

The technology discussed below relates generally to wireless communication systems, and more particularly, to fast user equipment reconfiguration in wireless communication.

INTRODUCTION

In wireless communication networks, a network may use radio resource control (RRC) signaling to provide system information to a user equipment (UE). The system information needed by the UE depends on the RRC state of the UE. For example, the network can transmit an RRC reconfiguration message to modify an RRC connection with the UE. The RRC reconfiguration message includes channel parameters and configurations. In response to the RRC reconfiguration message, the UE may reconfigure its connection(s) with one or more base station(s) based on the reconfiguration message. For example, the UE may apply the parameters to add, remove, and/or reconfigure one or more radio channels with the network.

In current network standards (e.g., 3G/4G networks), the RRC reconfiguration messages are typically UE-specific or dedicated messages to a specific UE. Therefore, when a cell serves many UEs, the base station needs to send a large number of dedicated reconfiguration messages to the UEs. In the initial deployment of next generation networks, a 4G network may serve as a control plane anchor point with 5G cells added and/or removed using a procedure similar to an LTE dual-connectivity (DC) procedure. Therefore, fast reconfiguration to switch user plane connections between 4G and 5G networks is needed to reduce interruption to user data.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of wireless communication operable at a network entity. The network entity transmits a plurality of connection configurations to a user equipment (UE). Each of the connection configurations includes a respective index, baseline configuration, and value tag. In some examples, the network entity may be a base station. The network entity selects a first connection configuration for the UE among the plurality of connection configurations. The network entity transmits a reconfiguration message to the UE, and the reconfiguration message includes the index and the value tag of the first connection configuration.

Another aspect of the present disclosure provides a network entity of a wireless network. The network entity includes a communication interface configured to communicate with a user equipment (UE), a memory, and at least one processor operatively coupled with the communication interface and the memory. The at least one processor and the memory are configured to transmit a plurality of connection configurations to the UE. Each of the connection configurations includes a respective index, baseline configuration, and value tag. The at least one processor and the memory are further configured to select a first connection configuration for the UE among the plurality of connection configurations. The at least one processor and the memory are further configured to transmit a reconfiguration message to the UE, and the reconfiguration message includes the index and the value tag of the first connection configuration.

Another aspect of the present disclosure provides a method of wireless communication operable at a user equipment (UE). The UE receives a plurality of connection configurations from a network. Each of the connection configurations includes a respective index, baseline configuration, and value tag. The UE receives a reconfiguration message from the network, and the reconfiguration message includes the index and the value tag of a first connection configuration of the plurality of connection configurations. The UE reconfigures one or more connections with the network based on the first connection configuration.

Another aspect of the present disclosure provides a user equipment (UE) that includes a communication interface configured to communicate with a network, a memory, and at least one processor operatively coupled with the communication interface and the memory. The at least one processor and the memory are configured to receive a plurality of connection configurations from the network. Each of the connection configurations includes a respective index, baseline configuration, and value tag. The UE receives a reconfiguration message from the network, and the reconfiguration message includes the index and the value tag of a first connection configuration of the plurality of connection configurations. The UE reconfigures one or more connections with the network based on the first connection configuration.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 is a diagram illustrating a table of some exemplary baseline configurations according to some aspects of the disclosure.

FIG. 12 is a flow chart illustrating an exemplary process for signaling reconfiguration messages at a UE according to some aspects of the present disclosure.

DETAILED DESCRIPTION

Figure 1:
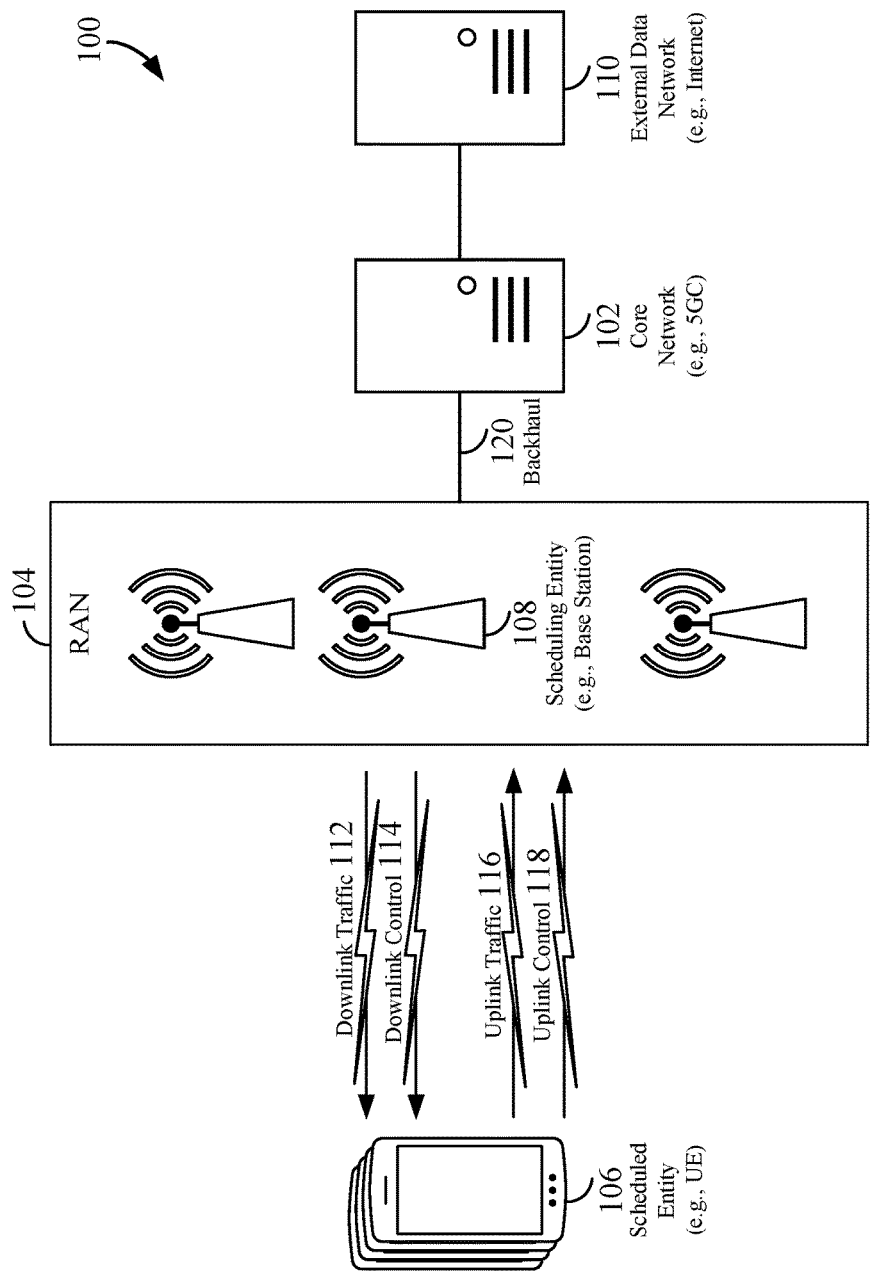
FIG. 1 is an exemplary wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In cellular networks, a base station can transmit a radio resource control (RRC) reconfiguration message or the like to reconfigure a network connection with a user equipment (UE). The base station may transmit the reconfiguration message to each UE as a dedicated message specific to that UE. For example, the base station may transmit different dedicated RRC reconfiguration messages (e.g., UE-specific messages) to respective UEs to establish, modify, and/or release radio bearers or connections; to perform handover; to set up, modify, and/or release measurements; to add, modify, and/or release secondary cells, etc. The base station may use RRC reconfiguration messages to send radio channel parameters to different UEs, and each UE can apply the received parameters to its layer 1 (L1) and/or layer 2 (L2) network entities to establish, modify, or release connections with the network. However, many of the reconfiguration messages have redundant information (e.g., identical RRC parameters for all the UEs in the same network area or cell). Therefore, it is inefficient to send the same RRC parameters separately to all UEs as dedicated messages (e.g., RRC reconfiguration messages).

In some implementations of next generation networks (e.g., 5G New Radio (NR), the existing RRC reconfiguration procedures may not be able to provide the speed and/or efficiency needed to support the increased complexity of a 5G network using LTE-5G dual-connectivity. Aspects of the present disclosure provide various connection reconfiguration signaling schemes to enable fast user equipment reconfiguration in wireless networks. In some aspects of the disclosure, the network can reduce reconfiguration signaling traffic or overhead by reducing the amount of configuration data sent to each UE in a reconfiguration message. In some examples, when a UE first enters a network area, the network (e.g., a base station) may provide the UE with a list of commonly used baseline configurations. Each baseline configuration may be identified by an index and value tag. Subsequently, the network may transmit a reconfiguration message including, for example, only the index and value tag to indicate the desired configuration. The network may also transmit UE-specific parameters to supplement or replace the baseline configuration. Some detailed examples will be provided below in reference to the drawings.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE (Long-Term Evolution). The 3GPP refers to this hybrid RAN as a next-generation RAN (NG-RAN) or non-standalone (NSA) mode. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
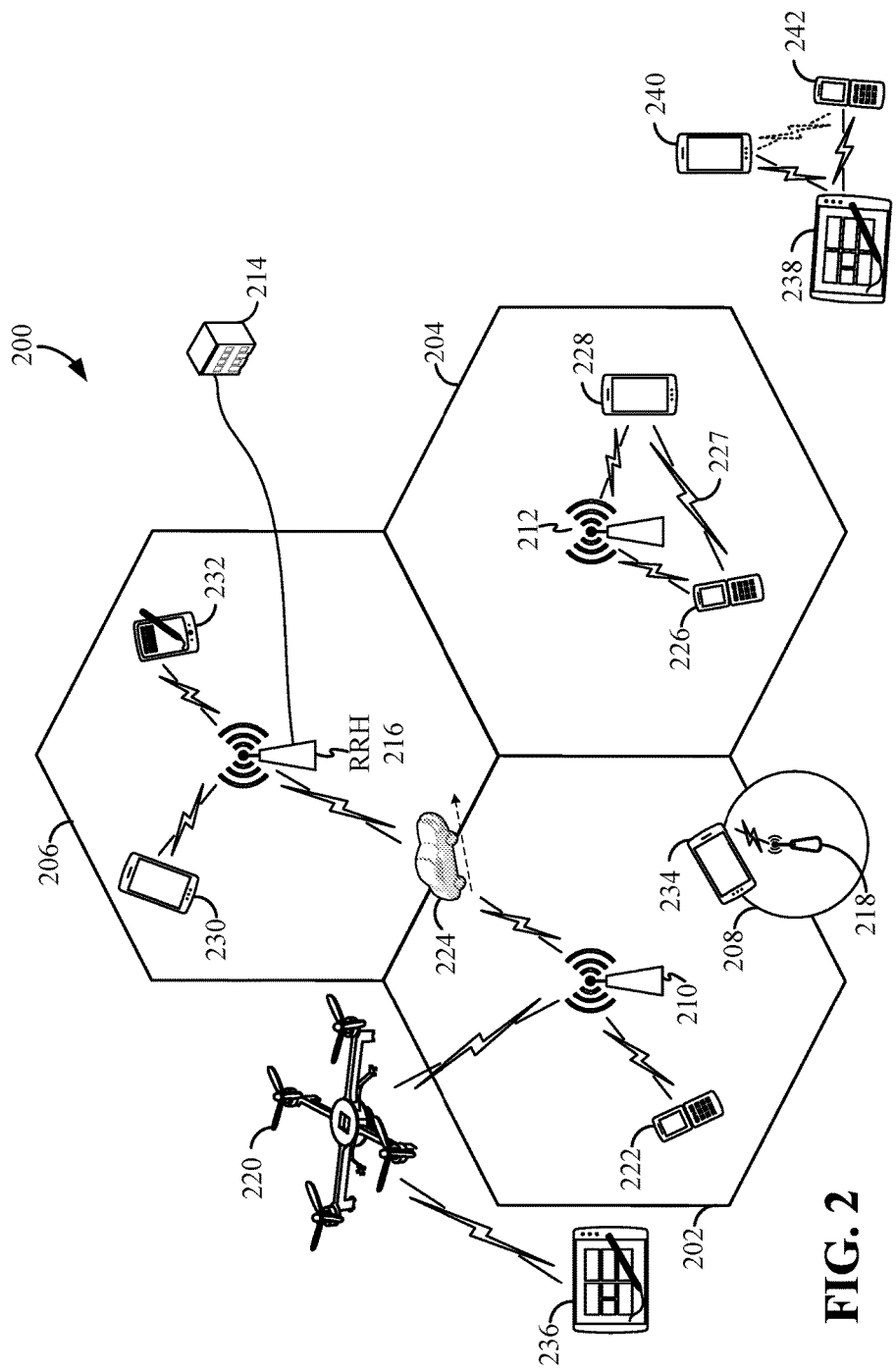
FIG. 2 is a conceptual diagram illustrating an example of a radio access network.

FIG. 2 is a conceptual diagram illustrating an example of a radio access network (RAN) 200. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). In some examples, the RAN 200 may include both 4G (e.g., LTE) and 5G cells that operate in a NSA mode or hybrid mode. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Figure 3:
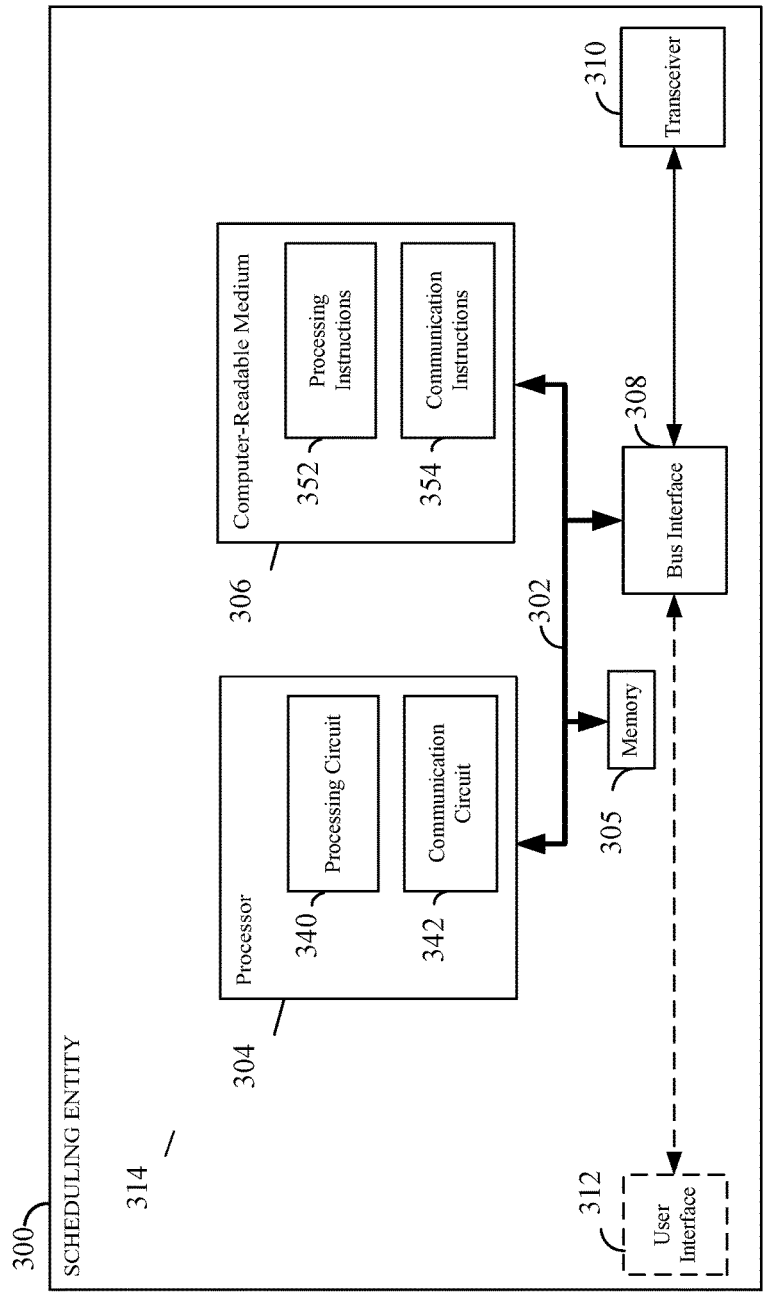
FIG. 3 is a block diagram illustrating an example of a hardware implementation for a scheduling entity employing a processing system.

FIG. 3 is a block diagram illustrating an example of a hardware implementation for a scheduling entity 300 employing a processing system 314. For example, the scheduling entity 300 may be a user equipment (UE) as illustrated in any one or more of FIGS. 1, 2, 5, 6, and/or 7. In another example, the scheduling entity 300 may be a base station or network entity as illustrated in any one or more of FIGS. 1, 2, 5, 6, and/or 7.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIGS. 5-12.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided. Of course, such a user interface 312 is optional, and may be omitted in some examples, such as a base station.

In some aspects of the disclosure, the processor 304 may include circuitry (e.g., a processing circuit 340 and a communication circuit 342) configured to implement one or more of the functions and procedures described in relation to FIGS. 5-12.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software (e.g., processing instructions 352 and communication instructions 354) configured to implement one or more of the functions described in relation to FIGS. 5-12.

Figure 4:
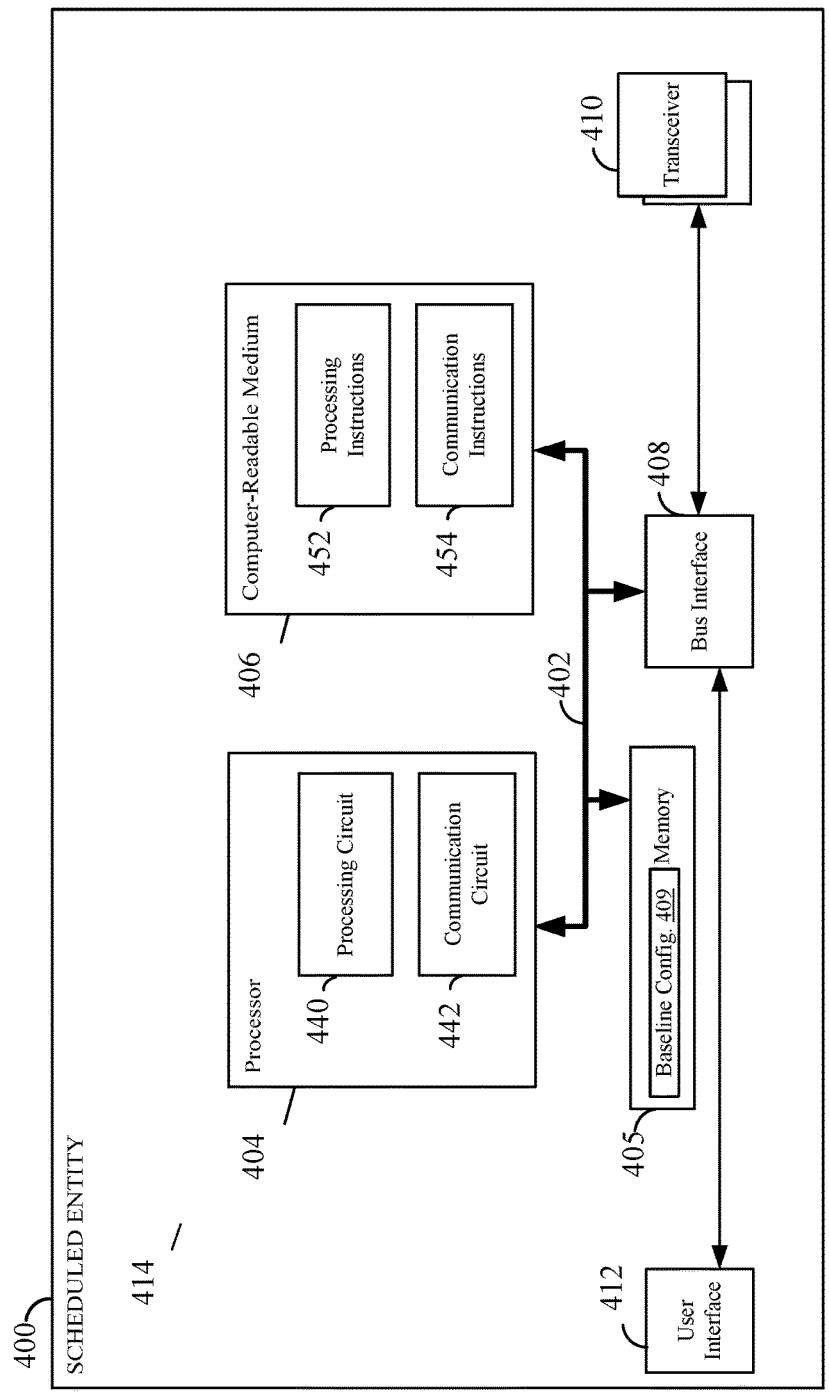
FIG. 4 is a block diagram illustrating an example of a hardware implementation for a scheduled entity employing a processing system.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1, 2, 5, 6, and/or 7.

The processing system 414 may be substantially the same as the processing system 314 illustrated in FIG. 3, including a bus interface 408, a bus 402, memory 405, a processor 404, and a computer-readable medium 406. The memory 405 may store a plurality of baseline configurations 409 that may be used to reconfigure a connection between the UE and the network as described in relation to FIGS. 5-12. Furthermore, the scheduled entity 400 may include a user interface 412 and a transceiver 410 substantially similar to those described above in FIG. 3. The transceiver 410 may include one or more transceivers configured to communicate with a network using different radio access technology (e.g., 3G/4G, and 5G) using licensed or unlicensed bands. In various aspects of the disclosure, the processor 404, as utilized in a scheduled entity 400 or UE, may be used to implement any one or more of the processes and procedures described illustrated in relation to FIGS. 5-12.

In some aspects of the disclosure, the processor 404 may include circuitry (e.g., a processing circuit 440 and a communication circuit 442) configured to implement one or more of the functions and procedures described in relation to FIGS. 5-12. In one or more examples, the computer-readable storage medium 406 may include software (e.g., processing instructions 452 and communication instructions 454) configured to implement one or more of the functions and procedures described in relation to FIGS. 5-12.

In some aspects of the disclosure, base stations (e.g., eNB and gNB) of an access network 200 may use RRC reconfiguration messages to send radio channel parameters to UEs. A UE can apply the received parameters to its L1 and/or L2 network entities to establish one or more channels or connections with the network 200. A reconfiguration message may be a dedicated message that is UE specific. In some examples, a majority of parameters contained in the RRC reconfiguration messages may be identical for all UEs receiving the messages within an area that may include a number of cells or base stations. Some non-limiting examples of these parameters may include media access control (MAC) main configuration parameters, packet data convergence protocol (PDCP) configuration parameters, radio link control (RLC) configuration parameters, etc. Other exemplary parameters may include radio resource parameters defined in 3GPP specifications (e.g., 3GPP TS 36.331) that may be the same for some or all UEs in the same area. In some examples, the RRC reconfiguration messages may have a large number of parameters that are the same for all UEs even in LTE (Long-Term Evolution) networks supporting carrier aggregation (CA) and dual-connectivity (DC). For example, the UEs in the same area may get the same secondary cell (SCell) configurations.

Figure 5:
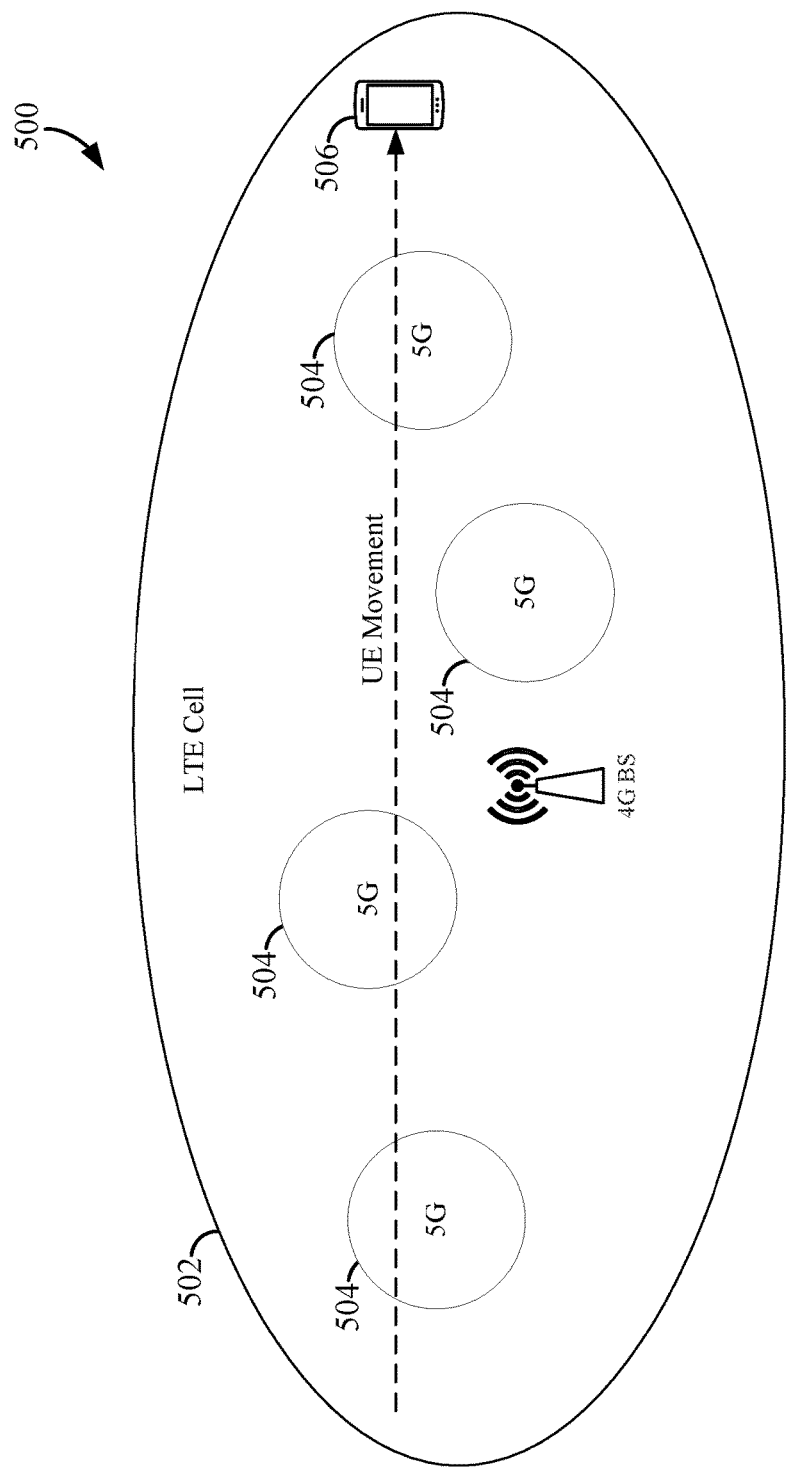
FIG. 5 is a diagram illustrating an exemplary network implemented in a non-standalone (NSA) mode including 4G and 5G cells according to some aspects of the disclosure.

FIG. 5 is a diagram illustrating an exemplary network 500 implemented in a non-standalone (NSA) mode including 4G and 5G NR cells according to some aspects of the disclosure. The network 500 may be the same as the RAN 200 or called a hybrid network. In the NSA mode, a 4G cell (an exemplary LTE cell 502 is shown in FIG. 5) acts as a control plane anchor point for a UE. In addition to a connection with the 4G cell, the network may add or remove connections between the UE and one or more 5G cells 504 using a procedure similar to an LTE dual-connectivity (DC) procedure. For example, when a UE 506 moves through the network 500, for example, from left to right in the figure, 5G cells are added and removed from the UE's connections with the network. In this example, the LTE cell 502 provides the control plane connection, and the 5G cells can provide the UE 506 with a faster data connection with the network. In some LTE-5G DC deployments, the 5G cells 504 may communicate with the UE 506 using millimeter wave (mm-Wave) or similar higher frequency signal, which can experience rapid changes in RF (radio frequency) and channel conditions. Therefore, frequent and unexpected 5G signal degradation and fluctuation may be expected, in particular, for a mobile device.

Figure 6:
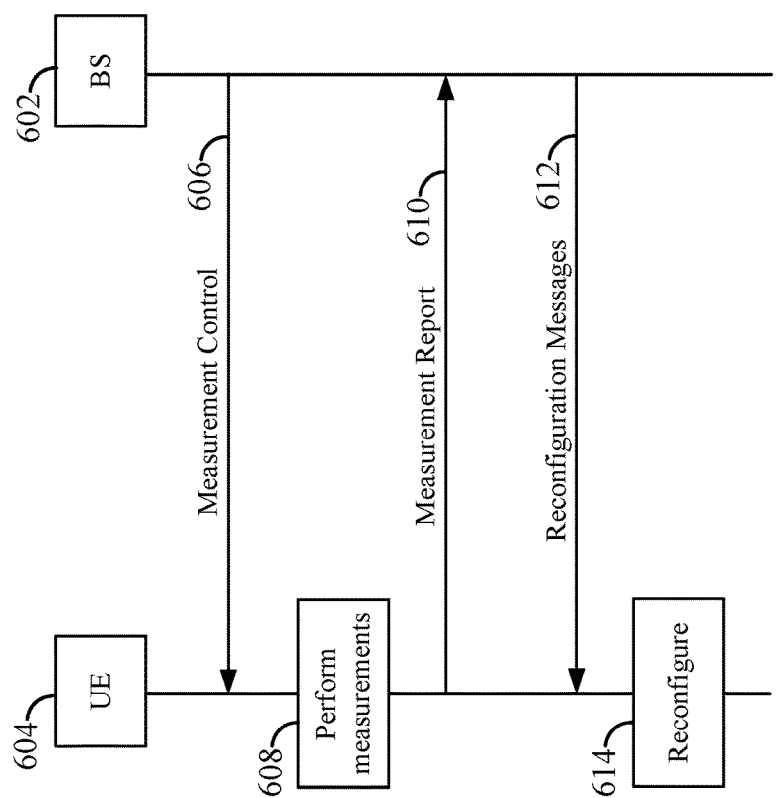
FIG. 6 is a diagram illustrating exemplary connection reconfiguration signaling between a UE and a network according to some aspects of the disclosure.

FIG. 6 is a diagram illustrating an exemplary LTE-5G DC reconfiguration procedure according to some aspects of the disclosure. A base station 602 (e.g., eNB or gNB) of an anchor cell may transmit various messages (e.g., measurement control messages 606) to configure a UE 604 to perform various measurements 608 (e.g., radio or channel measurements). Then, the UE 604 reports various measurement events 610 based on radio or channel conditions. In response to the measurement events 610, the base station 602 can add, remove, and/or reconfigure connections between the UE 604 and one or more secondary cells (e.g., 5G cells) by sending one or more reconfiguration messages 612 to the UE. Then, the UE 604 can apply a new configuration 614 based on the received reconfiguration messages 612.

In some aspects of the disclosure, the base station 602 may perform a reconfiguration procedure using RRC or layer 3 (L3) messages. In LTE-5G DC implementations, however, RRC level reconfiguration signaling and reconfiguration may not be fast enough to handle rapidly changing 5G RF or channel conditions. In some cases, a potentially large data interruption gap may be expected, and/or more frequent call drops may occur due to disrupted 5G connections. The messages for reconfiguring DC connections typically include a full set of radio link parameters. However, when 5G cells are added and/or removed frequently, the signaling overhead can become significant.

Aspects of the present disclosure provide a connection reconfiguration signaling scheme that can reduce reconfiguration overhead and/or improve efficiency by exploiting redundancy in the reconfiguration messages. Aspects of the present disclosure also provide a reconfiguration signaling scheme that can provide fast user plane switching in a hybrid network (e.g., between LTE and 5G networks) to reduce data interruption gap.

Figure 7:
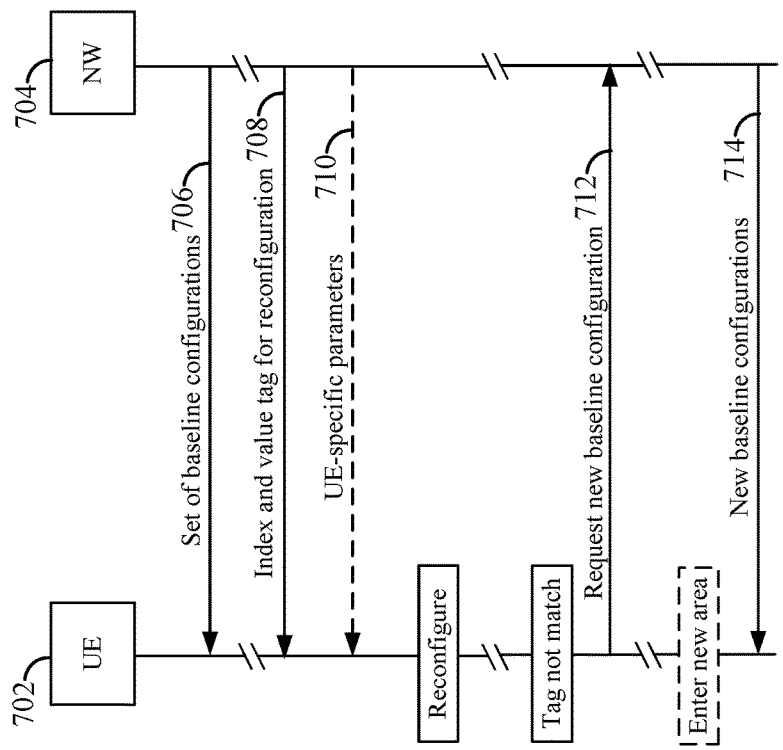
FIG. 7 is a diagram illustrating an exemplary connection reconfiguration procedure between a UE and a network according to some aspects of the disclosure.

FIG. 7 is a diagram illustrating an exemplary connection reconfiguration procedure 700 between a UE and a network according to some aspects of the disclosure. The UE 702 and network 704 may be similar to those illustrated in FIGS. 1 and 2. In one example, the access network 200 may define a coordinated coverage area (e.g., network 500 of FIG. 5) within which all base stations or scheduling entities (e.g., gNBs and eNBs) are coordinated. Base stations are coordinated when they can exchange information with each other via a wireless or wired connection (e.g., a backhaul) such that the base stations can coordinate, for example, their transmit and receive configurations (e.g., beamforming, power control, and scheduling, UL and DL direction, etc.).

When a UE 702 first enters a network area, the network 704 may send a set of commonly used baseline configurations 706 to the UE. For example, FIG. 8 illustrates a table 800 of some exemplary baseline configurations. In other aspects of the disclosure, the baseline configurations may be arranged, organized, transmitted, received, stored, and processed in other data formats or structures. In this example, each baseline configuration 802 has an index 804 and an associated value tag 806. Each baseline configuration may provide a number of connection parameters (e.g., radio resource parameters) that are commonly used among all the UEs in the same coverage area or cell. For example, a first configuration (configuration 1) may include parameters for configuring a UE to use a VOIP (Voice Over Internet Protocol) connection, and a second configuration (configuration 2) may include parameters for configuring a UE to use a high-speed data connection (e.g., 5G connection). Other configuration types (e.g., MAC main configuration, PDCP configuration, RLC configuration, handover, etc.) are also contemplated and within the scope of this disclosure. In some examples, different baseline configurations may have different parameters.

Referring back to FIG. 7, once the UE 702 has received the baseline configurations 706, a base station can signal future reconfiguration 708 by sending only the index 804 and value tag 806 for the desired configuration. The index 804 identifies the particular baseline configuration, and the value tag 806 (e.g., a value between 1 through n) indicates the actual values to be set for the parameters of the baseline configuration 802. For example, a baseline configuration may include a plurality of parameters (e.g., P1, P2, P3, and P4) that can be set to predetermined values based on the particular value tag used. Therefore, when the UE receives only the index and value tag of a certain configuration, the UE knows how to set the parameters In some examples, the network 704 may send UE-specific parameters 710 to supplement, change, override, or replace some or all parameters of the baseline configuration. If the received index and value tag for a baseline configuration are the same as that previously received and stored at the UE, the UE may perform reconfiguration according to the signaled baseline configuration and UE-specific parameters, if received. If the index and value tag do not match, the UE may transmit a request message 712 to the network to request a new baseline configuration. In response, the network 704 may send a new set of baseline configurations 714 to the UE.

With the above-described reconfiguration signaling scheme, the network can reduce the transmission of redundant information to the UEs. In some examples, the initial transmission of baseline configurations may be performed when the network loading or traffic is low or less than a predetermined threshold. Because the subsequent transmission of index and value tag (not including the actual configuration parameters) are relatively small in size compared to the baseline configuration parameters, the network may reduce overhead traffic significantly, reconfiguration time, and call setup time. When the UE moves out of the area (e.g., an area with coordinated base stations) or enters a new area, the UE can discard all stored baseline configurations and receive a new set of baseline configurations 714 from the network.

In some aspects of the disclosure, a network may disable the use of baseline configurations as described above when a UE is moving at a high rate of speed (i.e., faster than a predetermined speed). For example, a user may be using the UE in a vehicle moving at high speed. In other words, the features using the baseline configurations to avoid the transmission of redundant configuration information may be enabled or disabled based on the speed of the UE.

Figure 9:
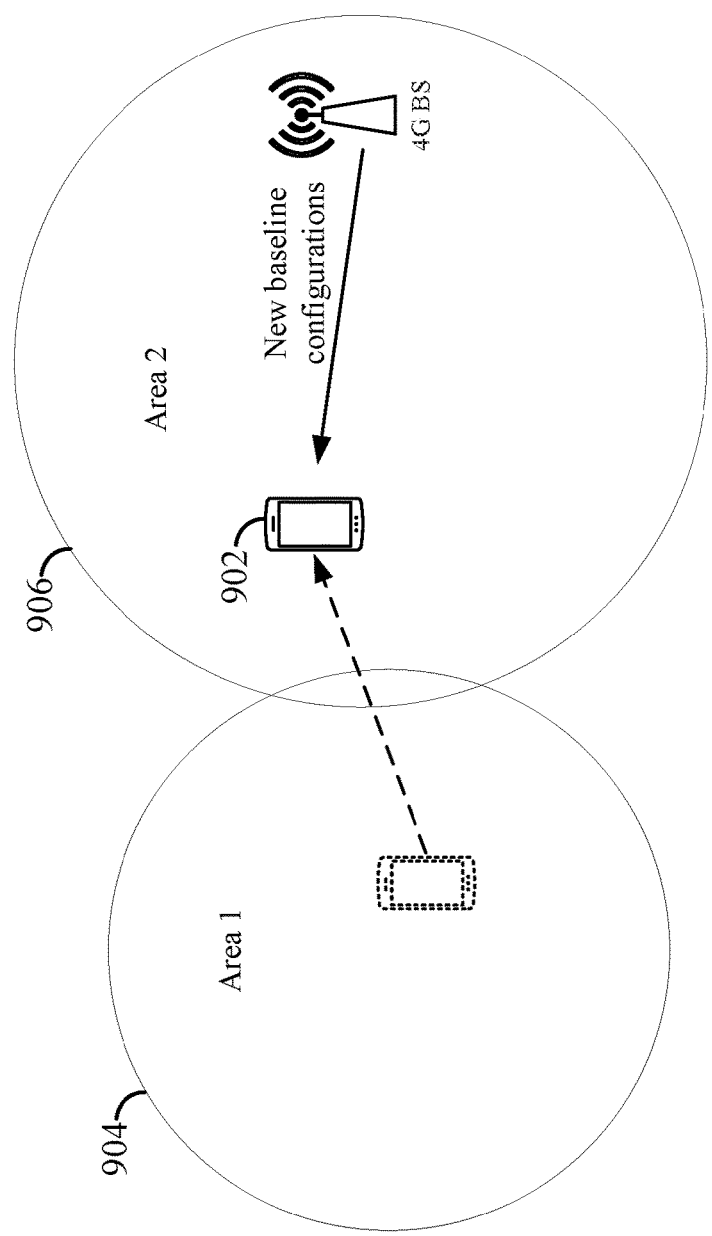
FIG. 9 is a diagram illustrating a UE moving from one coverage area to another coverage area according to some aspects of the disclosure.

FIG. 9 is a diagram illustrating a UE 902 moving from one coverage area 904 to another coverage area 906 according to some aspects of the disclosure. Each of the coverage areas may have a plurality of coordinated base stations (e.g., an LTE anchor cell and 5G base stations) like those of the network 500 in FIG. 5. For example, each area may include an LTE coverage providing the anchor function, and one or more smaller 5G cells providing a high-speed data connection. When the UE 902 enters a new coverage area 906, the network may send the UE another set of baseline configurations.

Figure 10:
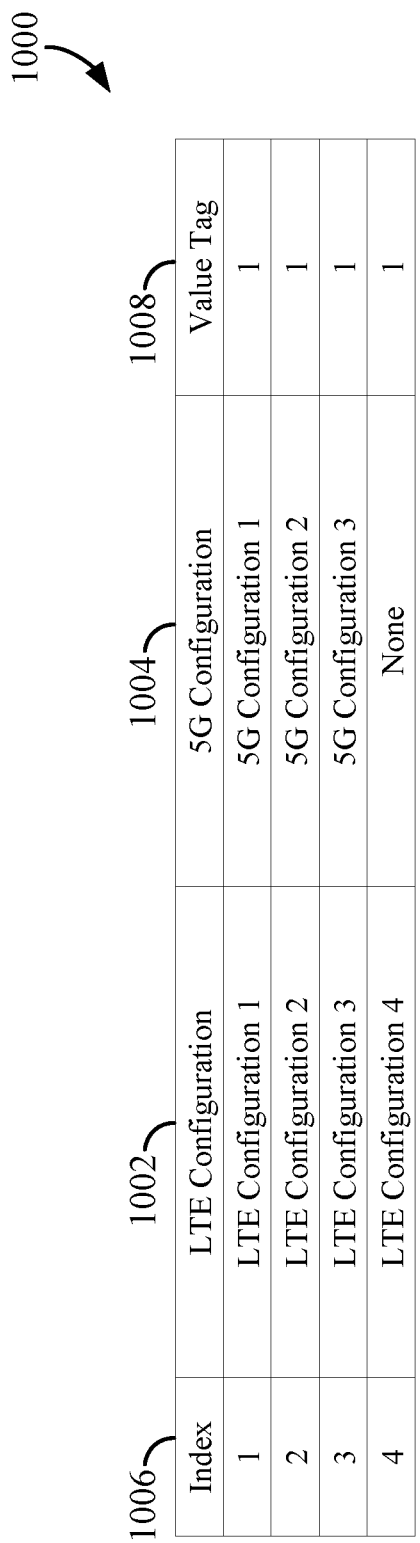
FIG. 10 is a diagram illustrating another table of some exemplary baseline configurations according to some aspects of the disclosure.

In another reconfiguration signaling scheme, a network configuration may include a combination of different baseline configurations for different radio access technology (RAT). Referring to FIG. 10, a table 1000 shows some exemplary baseline configuration combinations that can facilitate fast LTE and 5G switching. In this example, a network 500 may define an area in which 4G base stations (e.g., eNBs) and 5G base stations (e.g., gNBs) are coordinated to support a non-standalone mode (NSA) mode. Each of the configuration combinations may be defined based on anticipated UE capability. In table 1000, for example, each configuration combination has an LTE baseline configuration 1002, a 5G baseline configuration 1004, an index 1006, and a value tag 1008. Each baseline LTE configuration may configure a number of LTE parameters (e.g., LTE radio resource parameters) that are commonly used among all the UEs in the area. Similarly, each baseline 5G configuration may configure a number of 5G parameters (e.g., 5G radio resource parameters) that are commonly used among all the UEs in the area. The value tag (e.g., a value between 1 through n) may further define or indicate the particular values of the parameters contained in the corresponding LTE and 5G configurations.

When a UE first enters a coverage area (e.g., area 904), the network may configure the UE by sending the table 1000 or equivalent baseline configuration information to the UE. In some examples, the table 1000 may be broadcasted by the network. When the network needs to reconfigure 5G or LTE radio links or connections, the network can transmit only the index and the value tag of the desired configuration combination using a procedure similar to that shown in FIG. 7. This way, the network can significantly reduce the signaling overload or traffic when reconfiguring the connections between the UE and the network. In one example, the UE may be configured to use a configuration corresponding to index 1 and value tag 1, and the network may signal the UE to reconfigure to another configuration corresponding to index 2 or 3. If the received value tag is the same as the one stored at the UE for the index, the UE can apply the LTE configuration and 5G configuration corresponding to the signaled index and value tag. Otherwise, the UE may request for new baseline configurations. When the UE moves out of the area or enters a new area (e.g., area 906), the UE may discard all stored baseline configurations. When the UE enters another defined area, the network may provide the UE with another set of baseline configurations for that area.

With the above-described reconfiguration schemes, the network may avoid or reduce using L3 or RRC messages to perform radio link reconfiguration. For example, the network may use L1 and/or L2 report (e.g., MAC control element) to trigger link switching. For example, the network may transmit the index and value tag of a baseline configuration using L1 and/or L2 report.

Figure 11:
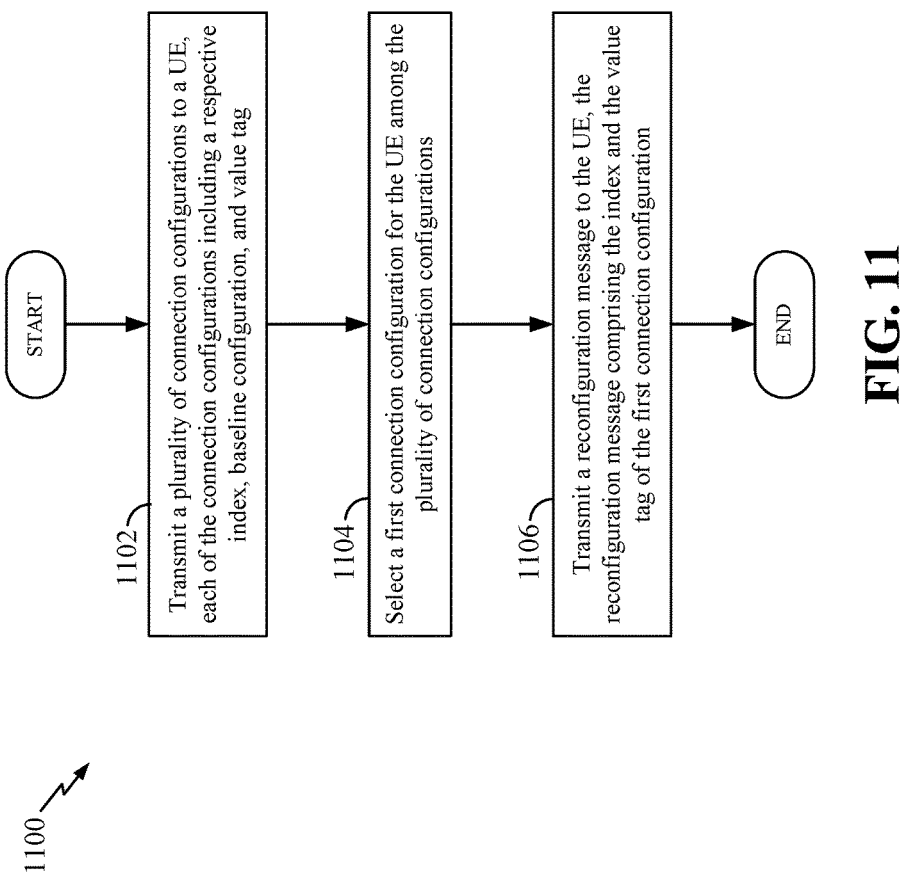
FIG. 11 is a flow chart illustrating an exemplary process for signaling reconfiguration messages at a network entity according to some aspects of the present disclosure.

FIG. 11 is a flow chart illustrating an exemplary process 1100 for signaling reconfiguration messages at a network entity in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 300 illustrated in FIG. 2. In some examples, the process 1100 may be carried out by any suitable apparatus, base station, network entity, or means for carrying out the functions or algorithm described below.

At block 1102, a network entity (e.g., base station or eNB) may transmit a plurality of connection configurations to a UE. The network entity may be a base station of an anchor cell in the network 500 (see FIG. 5) implemented in a non-standalone (NSA) mode including 4G and 5G cells. For example, the network entity may utilize a communication circuit 342 and a transceiver 310 (see FIG. 3) to transmit the connection configurations. Each of the connection configurations includes a respective index, baseline configuration, and value tag. For example, the connection configurations may be similar to those illustrated in FIGS. 8 and 10.

At block 1104, the network entity may select a first connection configuration for the UE among the plurality of connection configurations. There are various situations in which the network may reconfigure the UE to use different connection configurations. For example, the network entity may utilize a processing circuit 340 (see FIG. 3) to determine to add a connection between the UE and a first cell in a coverage area of the network entity, remove a connection between the UE and a second cell in the coverage area, reconfigure a connection between the UE and the network entity, and/or reconfigure a connection between the UE and a third cell in the coverage area. In one example, the first configuration may be any of the baseline configurations of FIG. 8 or configuration combinations of FIG. 10.

At block 1106, the network entity may transmit a reconfiguration message to the UE. The reconfiguration message may include the index and the value tag of the first configuration, but not the actual baseline configuration parameters. For example, the network entity may utilize the communication circuit 342 to transmit the reconfiguration message using an L1 or L2 message. The network can save network bandwidth by not transmitting the actual baseline configuration parameters.

FIG. 12 is a flow chart illustrating an exemplary process 1200 for signaling reconfiguration messages in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 300 illustrated in FIG. 3. In some examples, the process 900 may be carried out by any suitable apparatus, UE, or means for carrying out the functions or algorithm described below.

At block 1202, a UE may receive a plurality of connection configurations from a network. The network may be the network 500 (see FIG. 5) implemented in a NSA or hybrid mode including 4G and 5G cells. For example, the UE may utilize the communication circuit 442 (see FIG. 4) to receive the connection configurations. Each of the connection configurations may include a respective index, baseline configuration, and value tag. For example, the connection configurations may be similar to those illustrated in FIGS. 8 and 10.

At block 1204, the UE may receive a reconfiguration message from the network. For example, the UE may utilize the communication circuit 442 to receive the reconfiguration message. The reconfiguration message may include the index and the value tag of a first connection configuration of the plurality of connection configurations. However, the reconfiguration message may not include the actual parameter values of the first connection configuration. In one example, the first connection configuration may be any of the baseline configurations of FIG. 8 or configuration combinations of FIG. 10.

At block 1206, the UE may reconfigure one or more connections with the network based on the first connection configuration. For example, the UE may utilize a processing circuit 440 (see FIG. 4) to reconfigure the one or more connections by adding a connection between the UE and a first cell in a coverage area of the network entity, removing a connection between the UE and a second cell in the coverage area, reconfiguring a connection between the UE and the network entity, and/or reconfiguring a connection between the UE and a third cell in the coverage area.

With the above-described reconfiguration signaling processes 1100 and 1200, reconfiguration signaling traffic and overhead can be reduced in the network, and connection setup time can be reduced.

In one configuration, the apparatus 300 and/or 400 for wireless communication includes various means configured to perform the functions and procedures described above in relation to FIGS. 1-12. In another aspect of the disclosure, the aforementioned means may be a circuit or any apparatus configured to perform the functions recited by the aforementioned means.

Of course, in the above examples, the circuitry included in the processor 304/404 is merely provided as an example, and other means for carrying out the described functions may be included within various aspects of the present disclosure, including but not limited to the instructions stored in the computer-readable storage medium 306/406, or any other suitable apparatus or means described in any one of the FIGS. 1, 2, 5, 6, and/or 7, and utilizing, for example, the processes and/or algorithms described herein in relation to FIGS. 5-12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a network entity, comprising:

transmitting, to a user equipment (UE), a plurality of connection configurations for connecting with a network comprising the network entity and a plurality of scheduling entities that are configured to coordinate in transmit and receive configurations in a coordinated coverage area, each of the connection configurations comprising a respective index, baseline configuration, and value tag, the baseline configuration comprising a plurality of connection parameters used by the UE and a plurality of scheduled entities in the coordinated coverage area;

selecting a first connection configuration for the UE among the plurality of connection configurations, in response to channel conditions between the UE and the network in the coordinated coverage area; and transmitting a reconfiguration message to the UE to reconfigure a connection between the UE and the network in the coordinated coverage area, the reconfiguration message comprising the index and the value tag of the first connection configuration.

2. The method of claim 1, wherein the value tag indicates one or more parameter values of the corresponding baseline configuration.

3. The method of claim 1, wherein the reconfiguration message comprises no parameter values of the baseline configuration.

4. The method of claim 1, wherein the first connection configuration is configured to at least one of:
add a connection between the UE and a first cell in the coordinated coverage area;
remove a connection between the UE and a second cell in the coordinated coverage area;
or
reconfigure a connection between the UE and a third cell in the coordinated coverage area.

5. The method of claim 1, wherein the plurality of connection configurations comprise a plurality of radio resource control (RRC) configurations.

6. The method of claim 1, wherein the transmitting the plurality of connection configurations comprises transmitting a radio resource control (RRC) message comprising the plurality of connection configurations.

7. The method of claim 1, wherein the first connection configuration comprises:
a first configuration of a first connection between the UE and the network entity in the coordinated coverage area using a first radio access technology (RAT); and
a second configuration of a second connection between the UE and one of the plurality of scheduling entities in the coordinated coverage area, the second connection using a second RAT that is different from the first RAT.

8. The method of claim 1, wherein the transmitting the reconfiguration message comprises transmitting a layer 1 or layer 2 message comprising the reconfiguration message.

9. The method of claim 1, further comprising:
transmitting a UE-specific message to the UE, to override one or more parameters of the first connection configuration.

10. A network entity of a wireless network, comprising:
a communication interface configured to communicate with a user equipment (UE);
a memory; and
at least one processor operatively coupled with the communication interface and the memory,
wherein the at least one processor and the memory are configured to:
transmit, to the UE, a plurality of connection configurations for connecting with the wireless network comprising the network entity and a plurality of scheduling entities that are configured to coordinate in transmit and receive configurations in a coordinated coverage area, each of the connection configurations comprising a respective index, baseline configuration, and value tag, the baseline configuration comprising a plurality of connection parameters used by the UE and a plurality of scheduled entities in the coordinated coverage area;
select a first connection configuration for the UE among the plurality of connection configurations, in response to channel conditions between the UE and the wireless network in the coordinated coverage area; and
transmit a reconfiguration message to the UE to reconfigure a connection between the UE and the wireless network in the coordinated coverage area, the reconfiguration message comprising the index and the value tag of the first connection configuration.

11. The network entity of claim 10, wherein the value tag indicates one or more parameter values of the corresponding baseline configuration.

12. The network entity of claim 10, wherein the reconfiguration message comprises no parameter values of the baseline configuration.

13. The network entity of claim 10, wherein the first connection configuration is configured to at least one of:
add a connection between the UE and a first cell in the coordinated coverage area;
remove a connection between the UE and a second cell in the coordinated coverage area;
or
reconfigure a connection between the UE and a third cell in the coordinated coverage area.

14. The network entity of claim 10, wherein the plurality of connection configurations comprise a plurality of radio resource control (RRC) configurations.

15. The network entity of claim 10, wherein the processor and the memory are further configured to transmit the plurality of connection configurations by transmitting a radio resource control (RRC) message comprising the plurality of connection configurations.

16. The network entity of claim 10, wherein the first connection configuration comprises:
a first configuration of a first connection between the UE and the network entity in the coordinated coverage area using a first radio access technology (RAT); and
a second configuration of a second connection between the UE and one of the plurality of scheduling entities in the coordinated coverage area, the second connection using a second RAT that is different from the first RAT.

17. The network entity of claim 10, wherein the processor and the memory are further configured to transmit the reconfiguration message using a layer 1 or layer 2 message comprising the reconfiguration message.

18. The network entity of claim 10, wherein the processor and the memory are further configured to:
transmit a UE-specific message to the UE, to override one or more parameters of the first connection configuration.

19. A method of wireless communication operable at a user equipment (UE), comprising:
receiving, from a network entity, a plurality of connection configurations for connecting with a network comprising the network entity and a plurality of scheduling entities that are configured to coordinate in transmit and receive configurations in a coordinated coverage area, each of the connection configurations comprising a respective index, baseline configuration, and value tag, the baseline configuration comprising a plurality of connection parameters used by the UE and a plurality of scheduled entities in the coordinated coverage area;
transmitting measurements to the network entity, the measurements indicating channel conditions between the UE and the network in the coordinated coverage area;
receiving a reconfiguration message from the network entity in response to the measurements indicating the channel conditions, the reconfiguration message comprising the index and the value tag of a first connection configuration of the plurality of connection configurations; and reconfiguring one or more connections with the network in the coordinated coverage area based on the first connection configuration.

20. The method of claim 19, wherein the plurality of connection configurations comprise a plurality of radio resource control (RRC) configurations.

21. The method of claim 19, wherein the receiving the plurality of connection configurations comprises receiving a radio resource control (RRC) message comprising the plurality of connection configurations.

22. The method of claim 19, wherein the reconfiguring comprises at least one of:
 adding a connection between the UE and a cell based on the channel conditions in the coordinated coverage area;
 removing a connection between the UE and a cell based on the channel conditions in the coordinated coverage area; or
 reconfiguring a connection between the UE and a cell based on the channel conditions in the coordinated coverage area.

23. The method of claim 19, wherein the receiving the reconfiguration message comprises receiving a layer 1 or layer 2 message comprising the reconfiguration message.

24. The method of claim 19, further comprising:
 receiving a UE-specific message that overrides one or more parameters of the first connection configuration.

25. The method of claim 19, wherein the first connection configuration comprises:
 a first configuration of a first connection between the UE and the network entity in the coordinated coverage area using a first radio access technology (RAT); and
 a second configuration of a second connection between the UE and one of the plurality of scheduling entities in the coordinated coverage area, the second connection using a second RAT that is different from the first RAT.

26. A user equipment (UE) comprising:
 a communication interface configured to communicate with a network;
 a memory; and
 at least one processor operatively coupled with the communication interface and the memory,
 wherein the at least one processor and the memory are configured to:
 receive, from a network entity, a plurality of connection configurations for connecting with the network comprising the network entity and a plurality of scheduling entities that are configured to coordinate in transmit and receive configurations in a coordinated coverage area, each of the connection configurations comprising a respective index, baseline configuration, and value tag, the baseline configuration comprising a plurality of connection parameters used by the UE and a plurality of scheduled entities in the coordinated coverage area;
 transmit measurements to the network entity, the measurements indicating channel conditions between the UE and the network in the coordinated coverage area;
 receive a reconfiguration message from the network entity in response to the measurements indicating the channel conditions, the reconfiguration message comprising the index and the value tag of a first connection configuration of the plurality of connection configurations; and
 reconfigure one or more connections with the network in the coordinated coverage area based on the first connection configuration.

27. The UE of claim 26, wherein the plurality of connection configurations comprise a plurality of radio resource control (RRC) configurations.

28. The UE of claim 26, wherein the at least one processor and the memory are further configured to receive the plurality of connection configurations using a radio resource control (RRC) message comprising the plurality of connection configurations.

29. The UE of claim 26, wherein the at least one processor and the memory are further configured to reconfigure the one or more connections by at least one of:
 adding a connection between the UE and a cell based on the channel conditions in the coordinated coverage area;
 removing a connection between the UE and a cell based on the channel conditions in the coordinated coverage area; or
 reconfiguring a connection between the UE and a cell based on the channel conditions in the coordinated coverage area.

30. The UE of claim 26, wherein the at least one processor and the memory are further configured to receive the reconfiguration message using a layer 1 or layer 2 message comprising the reconfiguration message.

31. The UE of claim 26, wherein the at least one processor and the memory are further configured to:
 receive a UE-specific message that overrides one or more parameters of the first connection configuration.

32. The UE of claim 26, wherein the first connection configuration comprises:
 a first configuration of a first connection between the UE and the network entity in the coordinated coverage area using a first radio access technology (RAT); and
 a second configuration of a second connection between the UE and one of the plurality of scheduling entities in the coordinated coverage area, the second connection using a second RAT that is different from the first RAT.

* * * * *